(12) United States Patent
Chavez et al.

(10) Patent No.: US 12,546,490 B1
(45) Date of Patent: Feb. 10, 2026

(54) EMERGENCY DEPLOYMENT OF A DRONE-BASED DEHUMIDIFIER

(71) Applicant: UIPCO, LLC, San Antonio, TX (US)

(72) Inventors: Carlos JP Chavez, San Antonio, TX (US); Gregory David Hansen, Fuquay Varina, NC (US); Bradly Jay Billman, Celina, TX (US); Kristina Suniga-Cabrera, San Antonio, TX (US); Dwayne Phillip Wilson, Crossroads, TX (US); Timothy Benjamin Czerlinsky, Dallas, TX (US); David Patrick Dixon, Boerne, TX (US)

(73) Assignee: United States Automobile Association (USAA), San Antonio, TX (US)

( * ) Notice: Subject to any disclaimer, the term of this patent is extended or adjusted under 35 U.S.C. 154(b) by 265 days.

(21) Appl. No.: 18/307,204

(22) Filed: Apr. 26, 2023

Related U.S. Application Data

(60) Provisional application No. 63/363,659, filed on Apr. 27, 2022.

(51) Int. Cl.
*B25J 9/16* (2006.01)
*B25J 9/00* (2006.01)
(Continued)

(52) U.S. Cl.
CPC ............... *F24F 3/14* (2013.01); *B25J 9/0003* (2013.01); *B25J 9/162* (2013.01); *F24F 11/56* (2018.01);
(Continued)

(58) Field of Classification Search
CPC ............... F24F 2110/20; F24F 3/1405; F24F 2003/144; F24F 2003/1446; B25J 9/16; B25J 9/162; B25J 9/0003; B25J 9/0093
See application file for complete search history.

(56) References Cited

U.S. PATENT DOCUMENTS

| 10,173,773 B1 | 1/2019 | Flick |
| 2005/0131645 A1* | 6/2005 | Panopoulos ......... G05D 1/0282 701/472 |

(Continued)

FOREIGN PATENT DOCUMENTS

| CN | 105069984 A | 11/2015 |
| CN | 206236251 U | 6/2017 |

(Continued)

OTHER PUBLICATIONS

U.S. Appl. No. 18/307,231, filed Apr. 26, 2023.
(Continued)

*Primary Examiner* — Jerry-Daryl Fletcher
*Assistant Examiner* — Daniel C Comings
(74) *Attorney, Agent, or Firm* — Plumsea Law Group, LLC

(57) ABSTRACT

A dehumidification system that can be used during emergencies. The system includes an autonomous vehicle carrying a dehumidification device. In response to information about a water-related disaster at a specific location, the system will instruct the vehicle to travel to the location, enter a building, and initiate a series of dehumidification cycles in the interior space of the building. The vehicle can navigate from room to room and determine whether moisture content levels exceed a specified threshold. In response, the vehicle can direct its dehumidification operation to these specific zones.

17 Claims, 12 Drawing Sheets

(51) Int. Cl.
*F24F 3/14* (2006.01)
*F24F 11/56* (2018.01)
*G05D 1/00* (2006.01)
*F24F 110/20* (2018.01)

(52) U.S. Cl.
CPC ......... *G05D 1/0011* (2013.01); *G05D 1/0212* (2013.01); *F24F 3/1405* (2013.01); *F24F 2003/144* (2013.01); *F24F 2110/20* (2018.01)

(56) References Cited

U.S. PATENT DOCUMENTS

| | | | |
|---|---|---|---|
| 2005/0262923 A1* | 12/2005 | Kates | F24F 11/30 73/29.01 |
| 2012/0061261 A1* | 3/2012 | Hsu | B01D 53/261 206/459.1 |
| 2015/0294543 A1 | 10/2015 | Ricks | |
| 2016/0116914 A1 | 4/2016 | Mucci | |
| 2018/0089622 A1 | 3/2018 | Burch, V | |
| 2019/0090705 A1 | 3/2019 | Thorne | |
| 2020/0043343 A1 | 2/2020 | Branson | |
| 2020/0205626 A1 | 7/2020 | Hickey | |
| 2021/0214905 A1 | 7/2021 | Adler | |
| 2021/0353804 A1 | 11/2021 | Dean | |
| 2022/0040514 A1 | 2/2022 | Claesson | |
| 2022/0061621 A1 | 3/2022 | Weyant | |
| 2022/0390135 A1* | 12/2022 | Saravanan | F24F 1/0358 |
| 2023/0110109 A1 | 4/2023 | Watanabe | |

FOREIGN PATENT DOCUMENTS

| | | | |
|---|---|---|---|
| CN | 210215136 U | 3/2020 | |
| CN | 117028736 A | 11/2023 | |
| DE | 202022107159 U1 | 1/2023 | |
| JP | 2012208835 A | 10/2012 | |
| JP | 2014007498 A | 1/2014 | |
| JP | 2020056603 A | 4/2020 | |
| KR | 102264952 B1 * | 6/2021 | ............. F24F 3/153 |
| WO | 2021260730 A1 | 12/2021 | |

OTHER PUBLICATIONS

U.S. Appl. No. 18/341,140, filed Jun. 26, 2023.
U.S. Appl. No. 18/341,175, filed Jun. 26, 2023.
Non-Final Office Action mailed Feb. 6, 2025 for U.S. Appl. No. 18/307,231.
Notice of Allowance mailed Jul. 30, 2025 for U.S. Appl. No. 18/341,175.
Rankin, A et al. "Daytime Mud Detection for Unmanned Ground Vehicel Autonomous Navigation." Proceedings of the Army Science Conference (26th) Held in Orlando, Florida on Dec. 1-4, 2008 [online], [retrieved on May 31, 2025]. Retrieved at <URL: https://apps.dtic. mil/sti/citations/ADM002187> (Year: 2008).
Ramalingman, B et al. Cascaded Machine-Learning Technique for Debris Classification in Floor-Cleaning Robot Application. Applied Sciences. 2018; 8(12):2649 [online], [retrieved on May 31, 2025]. Retrieved at <URL:https://doi.org/10.3390/app8122649> (Year: 2018).
Office Action mailed Jun. 4, 2025 for U.S. Appl. No. 18/341,175.
Notice of Allowance mailed Jun. 13, 2025 for U.S. Appl. No. 18/307,231.

\* cited by examiner

EMERGENCY DEPLOYMENT OF A DRONE-BASED DEHUMIDIFIER

CROSS-REFERENCE TO RELATED APPLICATION

This application claims the benefit of U.S. Provisional Patent Application Ser. No. 63/363,659 filed on Apr. 27, 2022 and titled "Emergency Deployment of a Drone-Based Dehumidifier", the disclosure of which is incorporated by reference herein in its entirety.

TECHNICAL FIELD

The present disclosure generally relates to dehumidification systems, and in particular to drones configured for deployment to buildings that have been exposed to moisture in order to perform timely dehumidification operations, especially during emergency conditions.

BACKGROUND

During disasters such as hurricanes, tornadoes, floods, and fires, residents of the associated disaster area are often forced to evacuate their homes. This makes performing recovery efforts for these residents difficult, as homes are damaged and remain vulnerable to the elements, and in many cases access to the buildings can be blocked or otherwise remain inaccessible for normal traffic. However, the period directly following such events is often a critical time for taking actions that can prevent long-term damage to the home. The longer the structure remains exposed to contaminants such as flood water, rain, hail, snow, or other undesirable elements, the greater the likelihood that the damage will be permanent or that repairs will be cost-prohibitive, and that components of the house will need to be completely replaced. In cases where insurers are responsible for a settlement, delays in the repair or cleaning of the house are typically associated with a rising payout to handle the higher level of damage. A house will benefit from damage control that can commence immediately following the disaster, both in terms of cost and overall loss.

There is a need in the art for a system and method that addresses the shortcomings discussed above.

SUMMARY

In one aspect, a method of providing moisture-reduction services at a target location is disclosed. The method includes a first step of obtaining, at a first time and via a first sensor of an autonomous vehicle navigating inside of a first building at the target location, first sensor data about a first portion of a first room in the first building. A second step includes determining, at an onboard computing system for the autonomous vehicle and based on the first sensor data, that a first moisture content level for the first portion of a first building is greater than a first threshold level, and a third step includes causing, via the onboard computing system, a dehumidification device installed on the autonomous vehicle to perform a first dehumidification cycle directed at the first portion at least until the first moisture content level falls below the first threshold level.

In another aspect, a drone-based dehumidification system includes an unmanned autonomous vehicle, a dehumidification device installed on the autonomous vehicle, a plurality of moisture detection sensors, and an onboard computing system configured to receive and process data from the sensors.

In another aspect, the disclosure describes a system for providing moisture-reduction services at a target location. The system includes one or more computers and one or more storage devices storing instructions that are operable, when executed by the one or more computers, to cause the one or more computers to (1) obtain, at a first time and via a first sensor of an autonomous vehicle navigating inside of a first building at the target location, first sensor data about a first portion of a first room in the first building; (2) determine, at an onboard computing system for the autonomous vehicle and based on the first sensor data, that a first moisture content level for the first portion of a first building is greater than a first threshold level; and (3) cause, via the onboard computing system, a dehumidification device installed on the autonomous vehicle to perform a first dehumidification cycle directed at the first portion at least until the first moisture content level falls below the first threshold level.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1A:
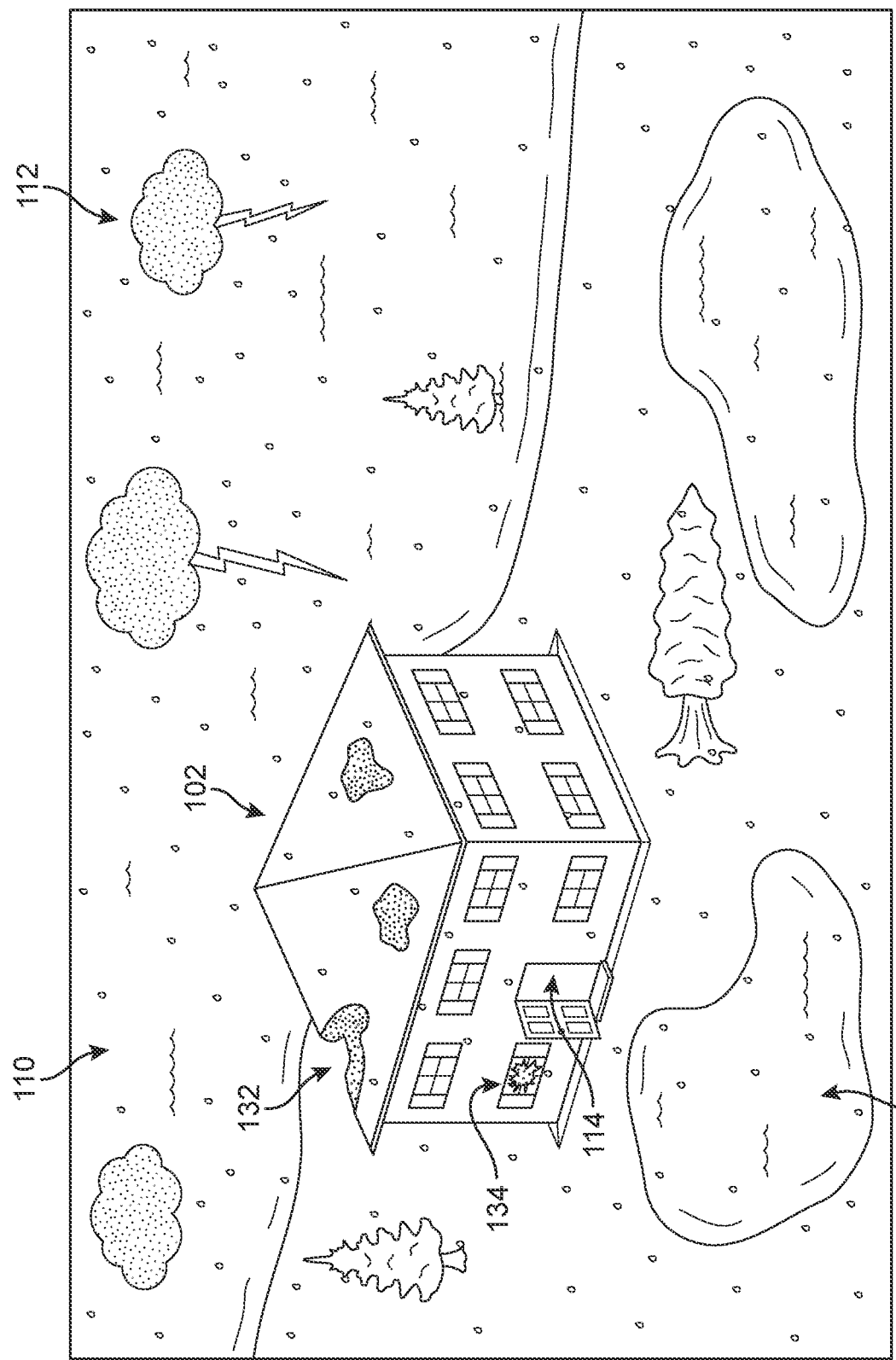
FIGS. 1A and 1B depict a scenario in which a drone-based dehumidification system has dispatched a dehumidifier drone to a residence, according to an embodiment.

The embodiments provide a drone-based dehumidification system that can be deployed in emergencies or other scenarios where a house or other building has been exposed to wet conditions and is vulnerable to moisture-related damage such as mold. In such scenarios, users may not be on-site, having evacuated themselves, or may be unable to initiate the dehumidification process due to lack of the necessary hardware or safety gear. Unfortunately, water damage due to events such as flooding, sewage back-up from flooding in the area, plumbing or roof leaks, damp basement or crawl spaces, overflows from sinks or bathtub, or high humidity, if not dealt with within 24-48 hours, will become a breeding ground for mildew and mold. Even worse, the impact will continue to grow until steps are taken to eliminate the source of moisture. The return of residents must often be delayed by contaminated floodwaters in the surrounding region, or water that might be electrically charged from underground or downed power lines, which further delays the critical clean-up.

In order to address these challenges and help reduce the humidity and temperature around a home before such damage occurs, the proposed embodiments offer a mechanism by which autonomous or semi-autonomous unmanned vehicles can be deployed to initiate and expedite the clean-up process. The proposed embodiments allow for these vital efforts to be conducted during the window of time directly subsequent to the water exposure event even while conditions remain dangerous for human visitors. The drones include a dehumidifier device ("dehumidifier") installed and/or integrated on the vehicle that can be used to initiate a drying operation at the homes. The dehumidifier drone assembly (may also be referred to by the terms "drone-based dehumidifier", "dehumidifier drone", "drone", or "assembly") of the embodiments can be delivered to the target location without regard for safety and reduce moisture levels during the critical period after the house was exposed to water. Upon entering the home, the dehumidifier device is automatically activated in response to the detection of moisture-impacted areas. In some embodiments, the drone includes a laser array to sense or detect areas of high moisture in the house and target its dehumidification efforts accordingly. In another embodiment, the drone includes provisions for drilling, tapping, or otherwise piercing holes into portions of the walls in order to facilitate airflow and reduce mold growth.

As a general matter, negative effects of moisture on building envelopes are well known. Some effects can include (a) loss of material in the affected structure due to changes in water volume when changing the physical phase and/or when chemical substances contained in water (e.g., salt) react with the affected material (e.g., plaster), (b) worsening of user's health and comfort due to the growth of mold in non-nutritive moist materials with traces of organic matter contamination, and (c) increase in energy consumption due to the lower thermal resistance of moist materials compared to dry materials leading to a lower degree of insulation of a building. These and other negative effects can result in outcomes that cause (a) catastrophic consequences for the integrity of the building, (b) illness and discomfort to users, and (c) high levels of energy waste, resulting in both increased economic costs and pollution.

For purposes of introduction, an overview of one embodiment of the proposed systems and methods is illustrated with reference to FIGS. 1A-2C. In FIG. 1A, at a first time 110, a first building 102 is shown during a catastrophic weather-related disaster (in this example, torrential storm 112). As a result of the storm 112, parts of the building have been broken or otherwise led to portions of the interior of the home becoming exposed to the exterior environment, such as damaged roof 132, and damaged windows 134. Floodwater 116 around the first building 102 has seeped into the home.

Figure 1B:
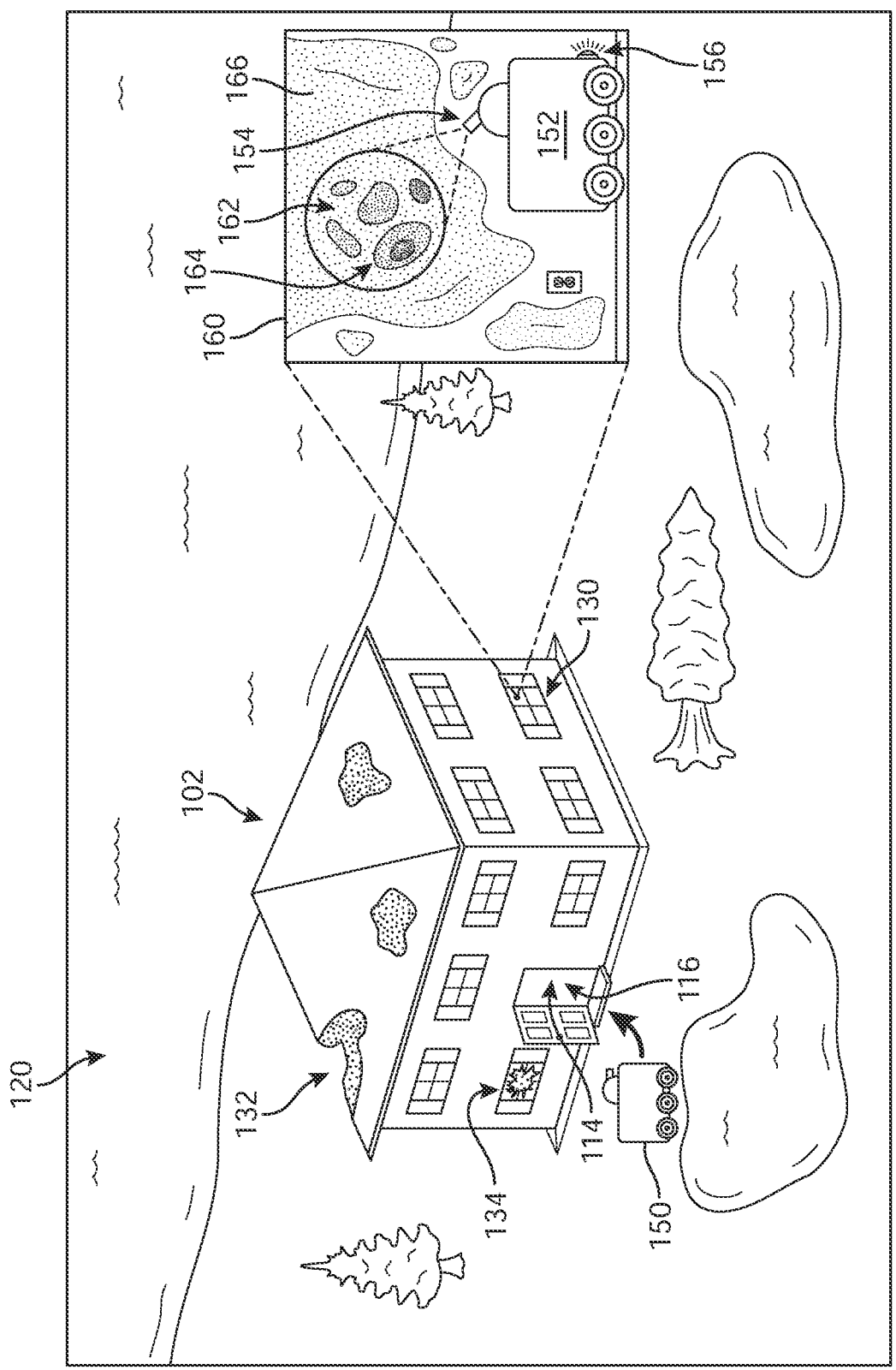

Typically, in this scenario, the residents have already evacuated their home. As noted earlier, the effects of moisture on the interior surfaces of the home can occur rapidly and a timely response can mean the difference between a simple remedy or a complete loss. Thus, the damage that has occurred will continue to cause deterioration of different parts of the building if no active repairs or preventative measures can be taken without human presence. Indeed, it can be appreciated that human entry on the property at this time is fraught with risk. However, as shown in FIG. 1B, the use of unmanned dewatering drones can initiate clean-up without a human presence. At a subsequent second time 120 and in accordance with the proposed embodiments, one or more drones 150 have been deployed in response to the conditions produced by the disaster. For purposes of illustration, a first drone 152 is shown in a magnified interior view 160 of the first building 102 as it moves through a first room 130. The first drone 152 comprises an unmanned vehicle, and is depicted as having moved from an entry point 114 (such as a doorway) into the home while it monitors moisture-related conditions in the interior spaces via one or more sensors 154 such as a moisture sensor. In this example, the sensors 154 detect an incidence 164 of high moisture (i.e., above an undesirable specified threshold) along a first portion 162 of a wall 166. In response, a dehumidifier 156 for the first drone 152 automatically begins to operate, directing its efforts (i.e., humid air intake) toward the first portion 162 of the wall 166.

Figure 2A:
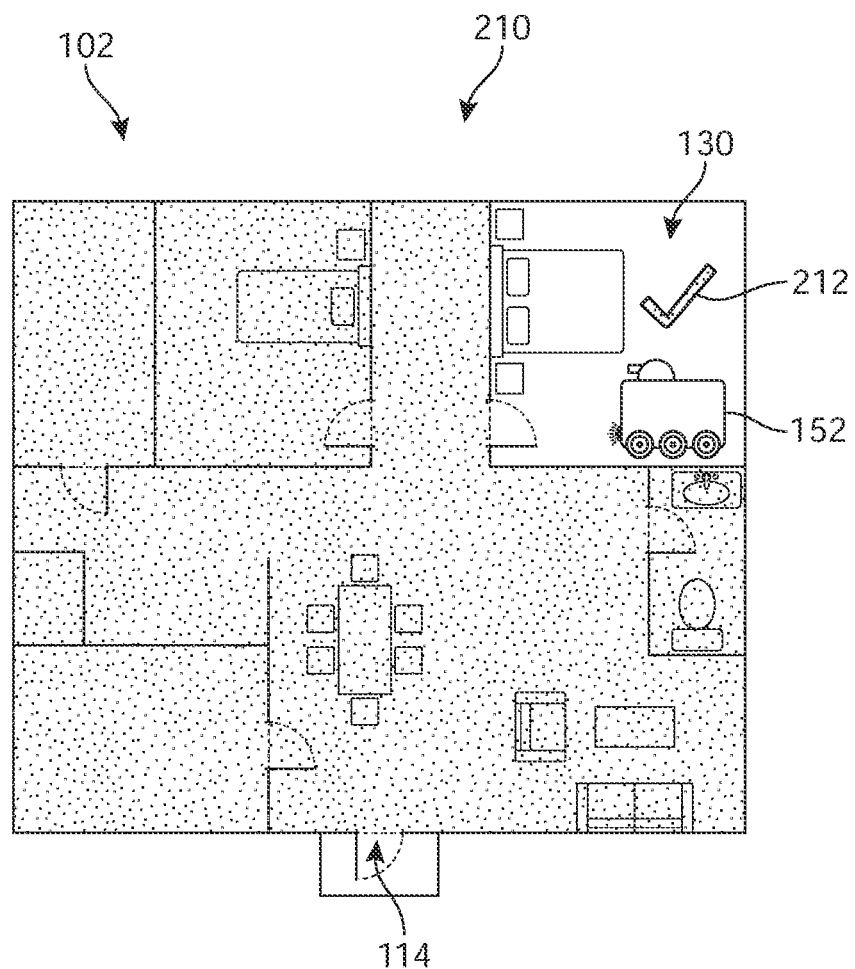
FIGS. 2A, 2B, and 2C are schematic views of a floor plan of the residence and the progress of the dehumidifier drone through the residence as it performs cycles of dehumidification, according to an embodiment.
Figure 2B:
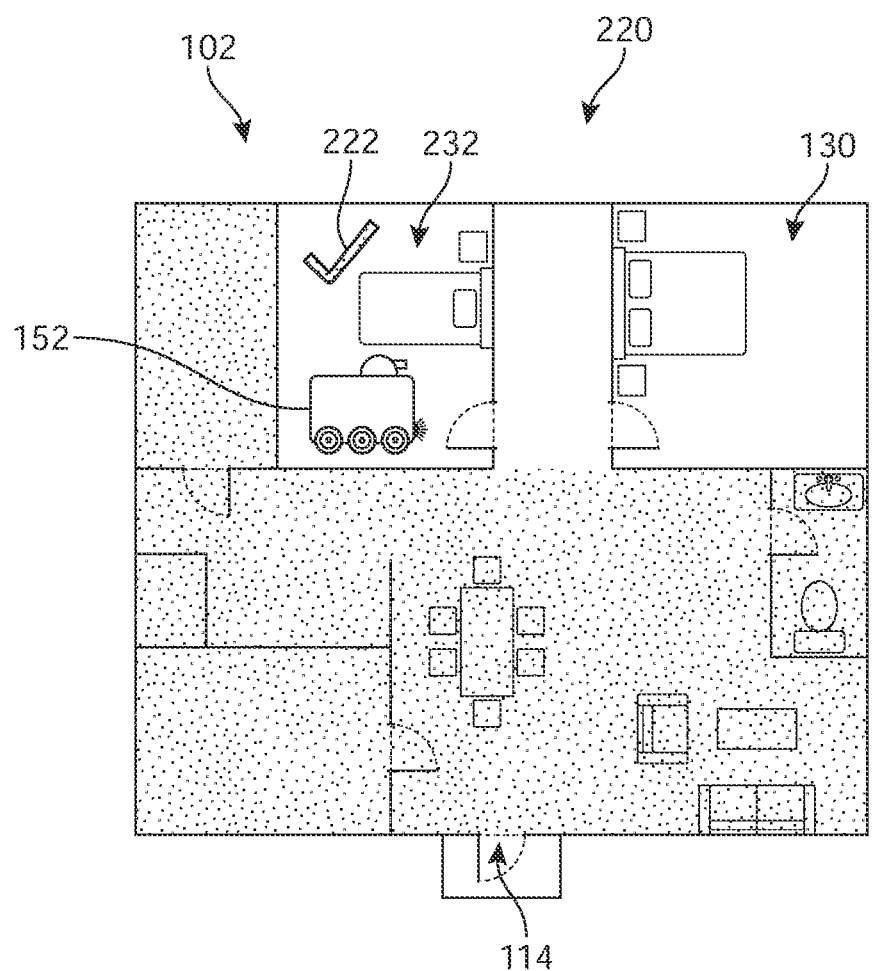
Figure 2C:
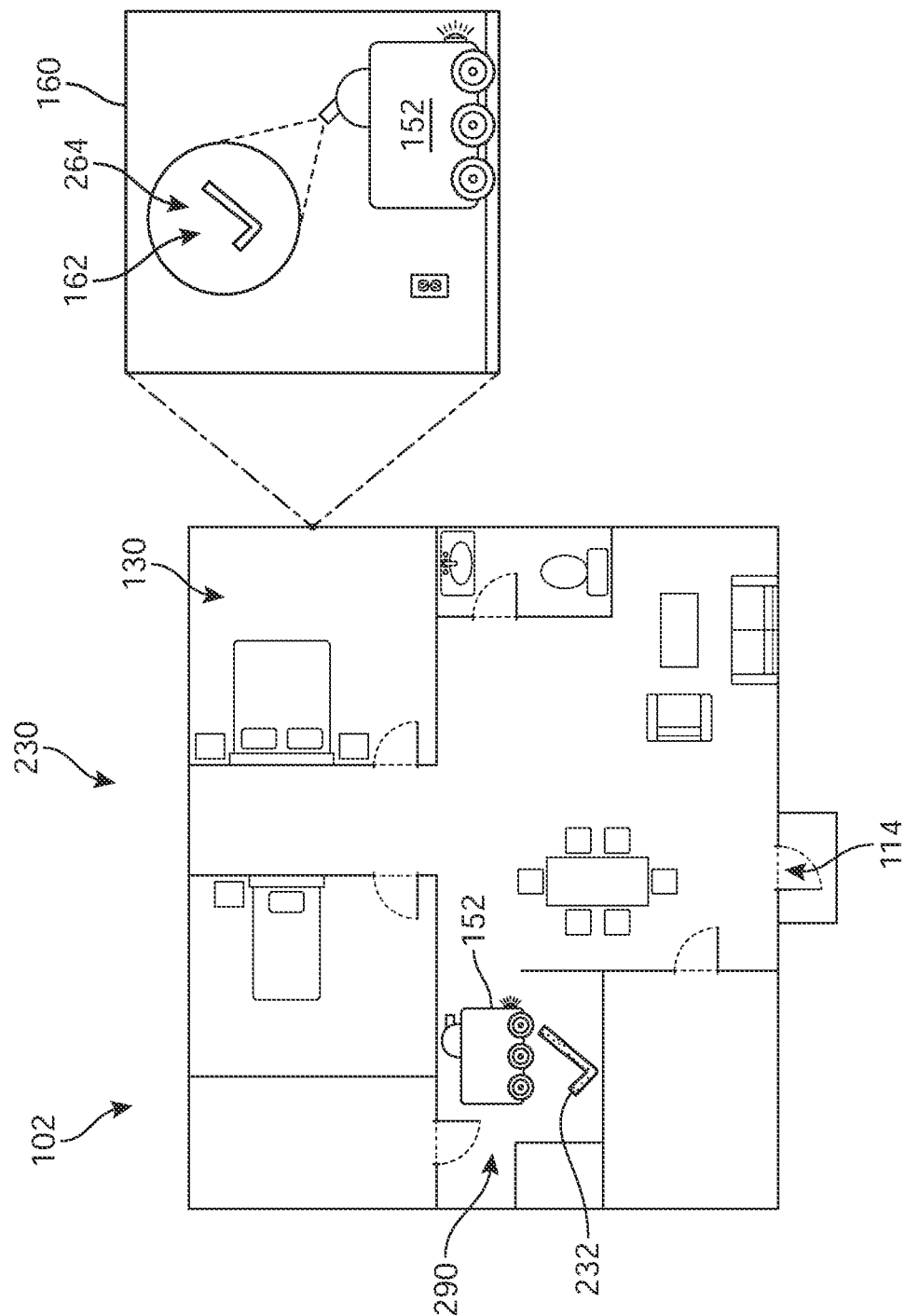

Referring now to FIGS. 2A, 2B, and 2C, the process of FIG. 1B can be understood to continue and extend across different areas of the first building 102, represented here in a top-down layout view. In FIG. 2A, the first room 130 in which the first portion of the wall is disposed is dehumidified in a first dehumidification session 212 over a first time period 210, substantially reducing the presence of moisture in the first room 130. Around or after this time, other drones or the same, first drone 152 can navigate to other sections of the home. For example, in FIG. 2B, the first drone 152 has moved to a second room 230, where a second dehumidification session 222 occurs over a second time period 220, significantly reducing the amount of moisture in the second room 230. In FIG. 2C, the first drone 152 is shown completing its path through the various sections of the home, as it conducts another final dehumidification session 232 over a third time period 230 in a third room 290. In other words, the first building 102 has-within only a few days of the flooding-benefited from a sharp reduction in moisture, without requiring human presence. As depicted in FIG. 2C, the wall 166 in first room 130 is now markedly cleaner and has little to no mold growth 264. The return of the home's occupants may be delayed but the impact of the flood has been greatly diminished without the risk to health or safety of any persons.

Figure 3:
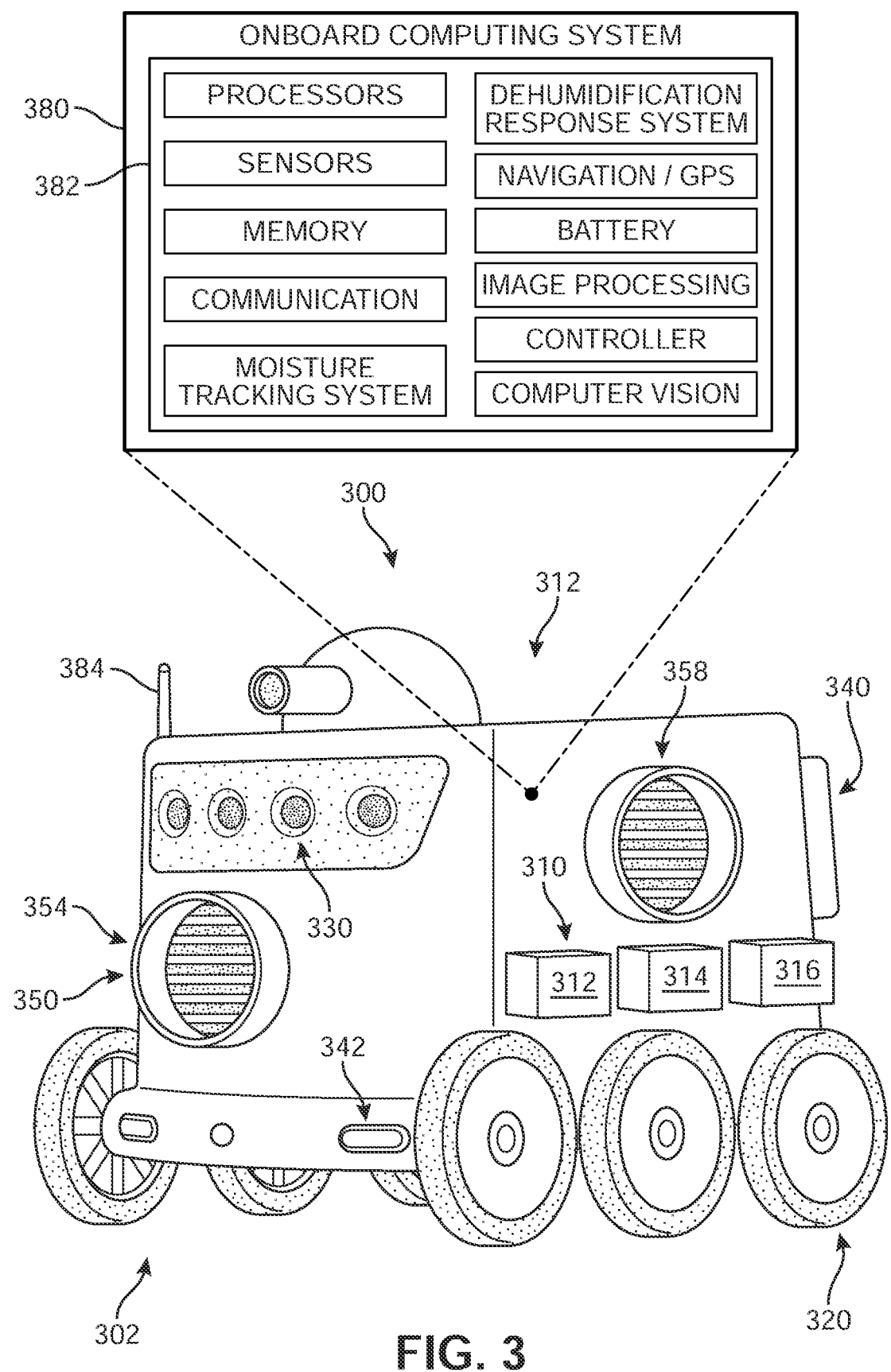
FIGS. 3 and 4 are schematic illustrations of a dehumidifier drone in an inactive state and active state, according to an embodiment.
Figure 4:
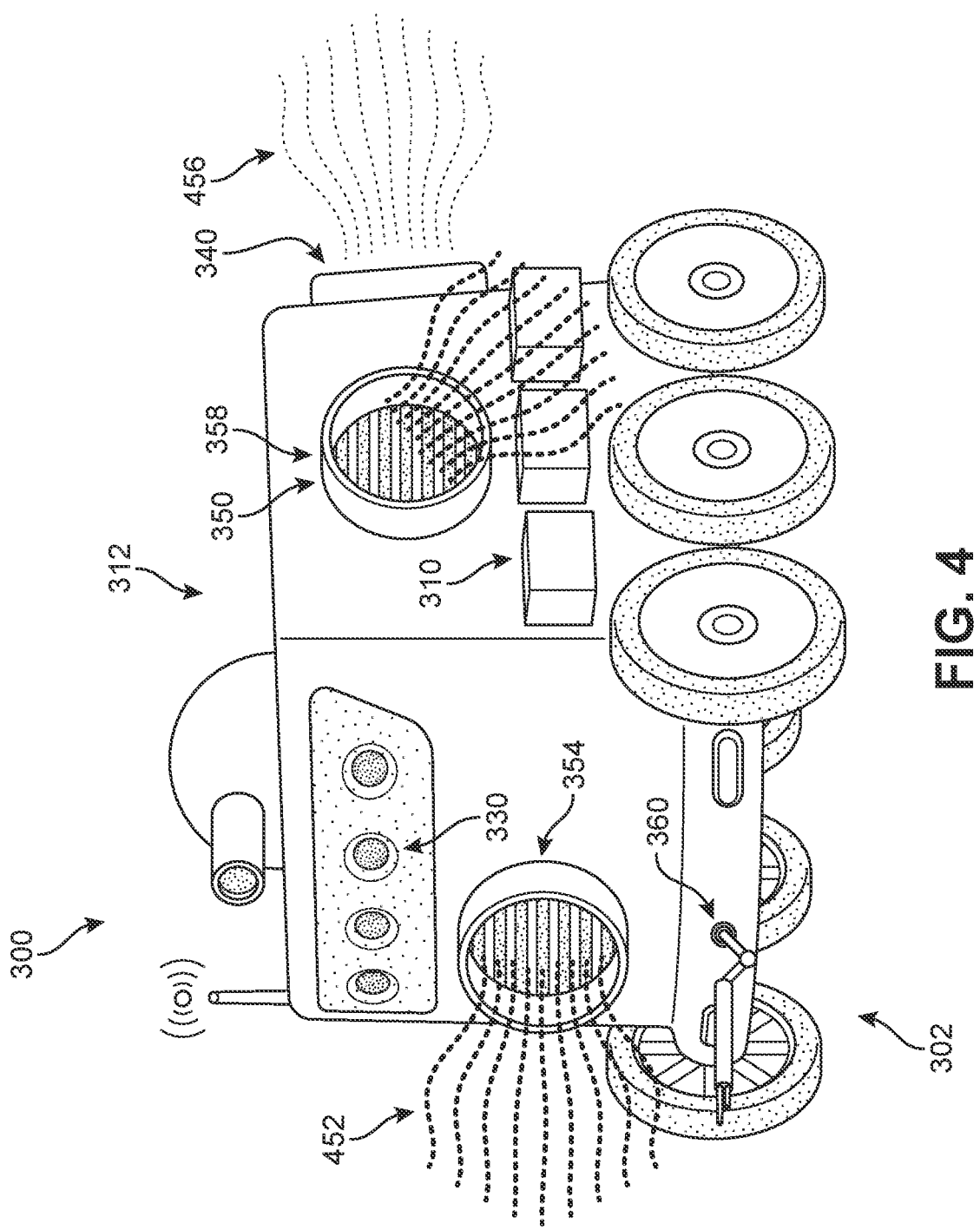

Referring next to FIGS. 3 and 4, an example of a drone dehumidification assembly ("assembly") 300 is presented. In different embodiments, assembly 300 will include an unmanned vehicle (UV) or self-driving vehicle or robot 302 capable of autonomous or semi-autonomous navigation on land or even sea or air, from a central drone repository or local carrier (see FIG. 6) to a target destination (such as a residence, building, or other location in need of clean-up assistance). For example, the vehicle 302 can include an onboard computing system 380, actuators, and a power system. The drone shown in the drawings is designed for ground travel and includes wheels 320. In other embodiments, the drone can include provisions for navigating through floodwater with one or more propellers and rudders. Other optional components can include lighting elements 342, and air flow tool 360. The vehicle 302 will typically operate in response to signals from the onboard computing system 380. The onboard computing system 380 can include components 382, including processor, memory, sensors 330, controller, a communication system, a navigation system, an image processing system, rechargeable battery, a moisture tracking system, a computer vision module, and a dehumidification response system. In some embodiments, the drones may be autonomous. That is, the drones may be programmable for delivery to designated destinations. In other embodiments, the drones may be piloted remotely to some extent to their target destinations.

Memory may comprise a non-transitory computer readable medium. Instructions stored within memory may be executed by the one or more processors. In addition, each drone may include a communication system such as a radio or other provisions for communicating using one or more communication methods. In particular, communication system includes provisions for communicating with other nearby devices and/or cloud server over a network. For example, each communication system could include a Wi-Fi radio, a Bluetooth radio, other NFC components, and/or a cellular network radio. Each drone can include provisions for communicating with, and processing information from, a cloud-based server as well as other devices in the home network. In one example, a navigation system is incorporated in the onboard computing system 380.

As noted above, the onboard computing system 380 can also include navigation module that can further include a GPS receiver for receiving GPS information that can be used to determine a GPS location for the vehicle. In addition, the navigation module can receive path instructions from a ground system and process and execute the instructions to direct the UAV along the pre-designated path. The navigation module will work in conjunction with the computer vision module, configured to interpret characteristics of the real 3D world into metric data through the processing of 2D image planes. It should be understood that the system's computer vision module will incorporate processing techniques that allow the drone to perform tasks such as machine inspection, navigation, 3D modeling, building and surveillance, as well as interaction with the environment. The accomplishment of these applications requires the execution of several algorithms that reside on onboard computing system 380, which process 2D images and provide 3D information. Some of these algorithms perform object recognition, object tracking, pose estimation, ego-motion estimation, optical flow and scene reconstruction. The navigation module will monitor the motion of the drone one place to another processing sensor data. The drone is configured to extract essential information for its state (kinematics and dynamics-state estimation), build a model of its surroundings (mapping and obstacle detection) and even track sequential objects of interest (target tracking) to enhance the perception capabilities. Thus, by combining localization and perception capabilities, the robotic platform is enabled for guidance tasks. The platform processes information from perception and localization parts to decide its next move according to the specified task (e.g., detecting and locating moisture-rich zones). The realization of actions derived from navigation and guidance tasks is performed by the controller which manipulates the inputs to provide the desired output enabling actuators for force and torque production to control the vehicle's motion. In some embodiments, different controllers can be used to fulfill mission enabled requirements (position, velocity and acceleration control).

Furthermore, in different embodiments, onboard computing system 380 may also include sensors 330 for measuring orientation, altitude, and/or acceleration. For example, sensors can include a gyroscope, an altimeter, and an accelerometer. In different embodiments, sensors 330 may also include a camera for capturing images and other light-based data for receipt by the image processing system. Camera may comprise any kind of camera, including any kind of digital camera, as well as a camera configured to capture infrared, x-ray, ultraviolet, and visible light signals.

In some embodiments, the onboard computing system 380 further includes an image capture and processing system, also referred to simply as image processing system. Image processing system may be used to store, process, and transmit image information. Additionally, in some cases, image processing system can receive navigation other coordinate/navigation information about one or more target locations. To facilitate these tasks, image capture and processing system may include one or more processors as well as memory. Memory can store instructions for programs that facilitate storing, processing, and transmitting image information. The processed image data can be provided to navigation module to execute a path around a building as the assembly 300 approaches its final destination.

Assembly 300 can include an onboard communication system for communication with a ground or central communication system. These communication components, such as antenna 384, enable information to be transmitted between the systems via a network or signal processing. Thus, the type of communication components used in each communication system can be selected according to the type of communication channel used. In some cases, a cellular network could be used so that each communication system includes a cellular radio or other component that enables cellular communication. Using a cellular network may enable information to be exchanged while assembly 300 is traveling in areas where Wi-Fi or other networks might be unavailable. In other cases, networks could comprise any kind of local area network and/or wide area network. In some cases, network may be a Wi-Fi network. In some embodiments, the ground system and drone are connected by network. In different embodiments, one or more components of assembly 300 could be disposed within a single computing device.

In different embodiments, the ground system (not shown) comprises a computing system with one or more processors and memory. The ground system includes provisions (e.g., a ground communication system) for communicating with various other systems as well as for processing image or other data received from UAVs. The ground system can also include a path planning module that works in conjunction with a navigation module of the assembly 300. The path planning module includes provisions for generating roadway and off-roadway driving path directions.

Sensors 330, in conjunction with moisture tracking system for onboard computing system 380, can also be configured to perform and apply Non-Destructive Testing (NDT) techniques. According to the ISO standard definitions, a technique is classified as NDT if it is an analysis technique used to evaluate the properties of a material, component, or system without causing damage. Then, an NDT technique is a specific way of using an NDT method, and an NDT method is a discipline that applies a physical principle in NDT. Sensors of the embodiments described herein are configured to detect, monitor, and/or measure, among others, acoustic emission, electromagnetic testing, gamma- and X-radiology, leak testing, liquid penetrant testing, magnetic particle testing, neutron radiology and gauging, ultrasonic testing, etc. In this way, the intrusive nature of the destructive techniques and the alterations they cause in the integrity of the structure are avoided with NDT techniques, in addition to gaining in objectivity and speed in results generation. For purposes of this application, the assembly 300 can be understood to carry one or more sensors that are configured to apply NDT techniques for the detection and characterization of moisture severity in buildings, both superficial and internal. As some non-limiting examples, assembly 300 can includes (1) sensors that employ electrical tomography in the spatial analysis of moisture in porous building materials (such as bricks and cement) of various thicknesses, (2) sensors that use gamma-rays and X-rays to determine moisture diffusivity, (3) sensors including dielectric and microwave meters to analyze moisture content, (4) sensors that use laser scanning, involving a procedure to automatically show where moisture appears in a building and assess moisture saturation and movement in building materials, respectively, (5) sensors that apply InfraRed Thermography (IRT) and electrical resistance measurement for in situ assessment of superficial moisture, (6) sensors that use Ground-Penetrating Radar (GPR) for internal moisture detection, (7) sensors using the near-infrared (NIR) spectrum via a non-contact, light-reflection type of moisture sensor that is based on a water molecule's light-absorbing characteristics the near-infrared (NIR) spectrum, and/or other sensors that can collect data relevant to the detection of moisture. Thus, the moisture tracking system can employ a wide range of sensors to accurately identify moisture content levels and the spread of the moisture across different materials and surfaces. In some embodiments, the moisture tracking system can also include a model that can predict the path of moisture in order to recommend a preemptive treatment of areas that are likely to be impacted if the moisture ingress is not addressed.

The proposed system also includes provisions for managing and reducing humidity levels in the air and surrounding surfaces. In different embodiments, the assembly 300 includes a dehumidification device 350, which operates in response to a determination made at the dehumidification response system. The dehumidification response system receives data from the moisture tracking system and is configured to make a variety of decisions and operations, including: (1) whether the moisture level detected by the moisture tracking system for a particular area is above a specific threshold; (2) identify areas of higher need based a comparative assessment of moisture levels in a single room or across the rooms of the house; (3) generate a sequence of targets for the dehumidifier based on need, accessibility, and relative importance of the structure (e.g., prioritize supportive structures that could be undermined by the moisture); (4) assess a battery level of the drone to estimate how much time the dehumidifier can operate in order to better optimize the dehumidification cycles; (5) cause one or more 'passive' dehumidification bags to be deployed in areas of high moisture; and/or (6) cause the robot arm to drill a hole in a surface to increase airflow in areas of high moisture, etc.

For example, in FIGS. 3 and 4, a dehumidification device is disposed in a housing 312 of the drone body. FIG. 3 presents the dehumidification device in its "off" or disabled state, where the drone vehicle itself may also be "off" and stationary, or be "on" while the vehicle is moving from one location to another. FIG. 4 presents the dehumidification device in its "on" or operational/active state, where humid air 452 is being pulled into the inlet(s) for dehumidification device and expelled as dry air 456 from the outlet(s) 340. The dehumidification device 350 can be observed to include a first humid air inlet 354 formed on a forward portion of the housing 312, and a second humid air inlet 358 formed along a side portion of the housing 312. In some embodiments, there may only be one inlet, or there may be additional inlets. Furthermore, dehumidification device 350 comprises a dry air outlet 340, in this case extending distally outward from a rear portion of the housing 312. Although not shown in FIGS. 3 and 4, the internally disposed portions of the dehumidification device can be understood to include standard components of a dehumidifier, such as a fan, condenser, evaporator, compressor, capillary tubes, water receptacle/tank, refrigerant, desiccant material, distiller, etc.

In some embodiments, the assembly 300 can also include one or more passive dehumidification systems, such as moisture absorber packages or dehumidifier bags 310 (e.g., desiccant). In this case, a first dehumidifier bag 312, a second dehumidifier bag 314, and a third dehumidifier bag 316 have been hung along an exterior of the housing 312. In some embodiments, the bags 310 are configured to increase on-site moisture absorption. In one embodiment, the assembly 300 can be configured to drop one or more of the bags 310 in each room or space of the target destination. In other words, the assembly 300 can include provisions by which to release and deploy the bags 310 which are removably attached to the housing 312. For example, the bags 310 may be hung on hooks that can be triggered to dip downwards, causing a bag to slide off and drop into a room. The deposited bag can then be left in the home, even after the departure of the drone, continuing to provide moisture removal service.

In another example, the assembly 300 can include one or more aerosol-based dehumidifier packages, cannisters, or devices. In such cases, the dehumidification device could move toward an area targeted for moisture treatment. The aerosol can be oriented toward the target and used to spray desiccant material (designed for moisture absorption) as needed in hard to reach and or damaged wall areas, etc. The desiccant material could then be vacuumed away via the dehumidification device (using an onboard vacuum hose) once the system determines sufficient time for maximum absorption of moisture had passed. In other words, in some embodiments, the dehumidification device can be configured to dispense desiccant beads in hard to reach places, such as behind or under fixtures, within walls (via a hole drilled by the robot effector arm), within cracks or apertures too small for the device to otherwise access, or inside baseboards.

In some embodiments, during operation—as shown in FIG. 4—the assembly 300 can determine that a portion of a room such as a wall has a moisture content level (percentage) that would be better treated by a greater flow of air in or around the wall. In such cases, the assembly 300 may deploy a robot effector arm 362 that extends from a forward portion of the housing 312. In some embodiments, the arm 362 is stored inside the housing 312 and, when engaged, emerges from an aperture 360 formed in the housing. In other embodiments, the arm 362 can be folded or otherwise collapsed and stored along an exterior surface of the housing 312 for ready deployment. In different embodiments, the arm 362 refers to a drilling spindle, drilling robot, or other tool by which a hole may be put in a material such as wood, metal, plaster, concrete, or other housing structural materials. In one embodiment, the arm 362 is articulated with six (or more) degrees of freedom, and a tooling at the end of the arm (i.e., a spindle). In another embodiment, the arm 362 refers to a SCARA robot (Selective Compliance Assembly Robot Arm, or Selective Compliance Articulated Robot Arm). The onboard computing system will incorporate a vision system using one or more sensors 330 to identify the target drill site and guide the arm 362 as it performs the operation. In some embodiments, computer vision module applies a combination of object detection and potential field algorithms to enable an autonomous operation of SCARA arm.

As a general matter, the drone's computer vision module will rely on data collected by the system's camera devices, as well as Inertial Measurement Unit (IMU) s to extract useful information onboard and feedback the necessary data, fused with measurements from inertial sensors. Different types of sensors can be employed depending on the task. Onboard ultrasonic sensors could be directly integrated in obstacle avoidance operations, while onboard laser range finders provide range measurements for obstacle detection and mapping of 3D environments. In some embodiments, visual stereo or monocular camera systems can be included in assembly 300 and are able to provide depth measurements for obstacle avoidance.

Figure 5:
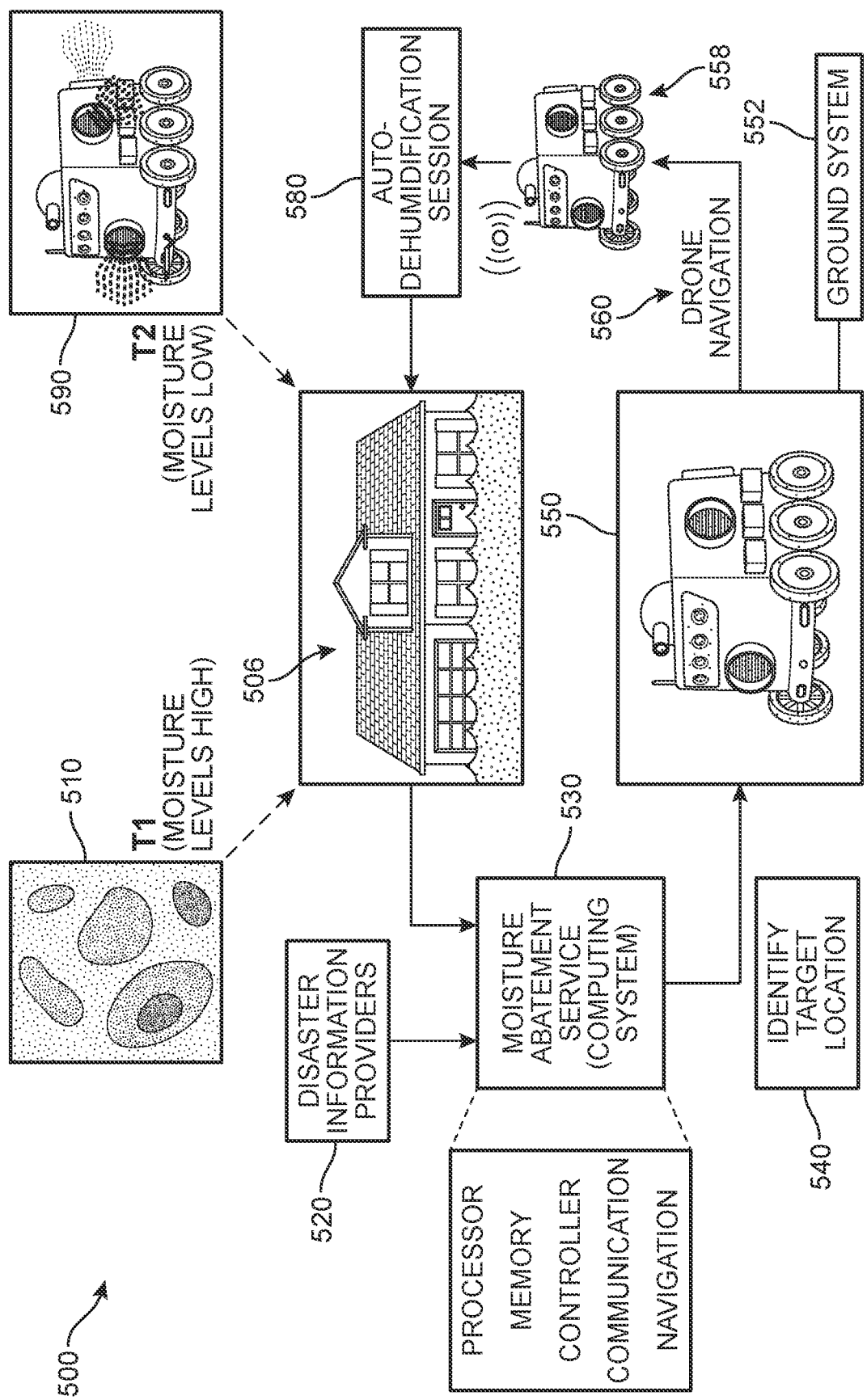
FIG. 5 is schematic illustration of a drone-based dehumidification system including a moisture abatement service, according to an embodiment.

For purposes of illustration, FIGS. 5-8 are a sequence of drawings showing one scenario in which an embodiment of the proposed drone dehumidification system 500 can be used. In the embodiment of FIG. 5, the system 500 can be seen to include a moisture abatement service ("service") 530 that is configured to automatically deliver dehumidifiers to buildings impacted by a water-related disaster, particularly locations where people have evacuated their homes. The service 530 determines when a disaster is pending, or is occurring, and automatically prepares and delivers dehumidifier(s) to a designated location or a tracked location. The dehumidifier can then be returned automatically via the drone.

In different embodiments, the service 530 includes a computing system. Computing system may comprise a server, a cluster of servers, or any suitable configuration of computing resources including one or more processors and memory. Memory may comprise a non-transitory computer readable medium. Instructions stored within memory may be executed by the one or more processors. Computing system may also include a navigation system that may be used for one or more purposes. For example, a navigation system may be used to look up addresses. Navigation system may also be used to acquire directions to one or more addresses. Navigation system may also be used to convert geographic locations provided in one format (for example, a set of GPS coordinates) to other location formats (such as a street address) for identification of target locations for the drone deployment.

The service 530 will be in communication with a drone dehumidifier repository 550. In different embodiments, service 530 may communicate with various other systems over one or more networks. Examples of networks that may be used to facilitate communication between different systems include, but are not limited to: Wi-Fi networks, cellular networks, local area networks (LANs), wide area networks (WANs), personal area networks (PANs), as well as any other suitable networks.

Furthermore, the service 530 may communicate with one or more disaster information providers 520. As used herein, the term "disaster information provider" refers to any entity that may transmit information about pending or ongoing disasters. As an example, the Emergency Alert System (EAS) is a federal system used in the United States to provide emergency notifications, including emergency weather alerts for specific geographic areas. In other embodiments, disaster information providers 520 could include any other organization (private or public) configured to deliver information about pending or ongoing disasters or emergencies. Alerts can be provided over any communication mode, including short messaging service (SMS) based texts, emails, or other suitable communication modes. Service 530 may also communicate with a Geographic Information System (GIS) provider, for example to retrieve maps and other related geographic information from GIS provider. In some embodiments, service 530 may also communicate with weather and traffic providers and receive real-time or near real-time information about weather and traffic in specific geographic locations. In some cases, real-time traffic information may include information about road closures in an area. In one embodiment, service 530 communicates with residents through one or more devices. As an example, a resident device owned by a resident in a particular geographic region may run an application for communicating information between service 530 and a resident. Resident device could include computing resources such as processors, memory, and a navigation system for detecting a current GPS location. Such devices may comprise mobile phones, tablets, smart watches or other mobile devices.

In different embodiments, affirmative data and reports regarding the presence of floodwater are beneficial to determining which buildings may require moisture abatement in a given geographic area. Data and reports that positively indicate flooding are definitive, whereas the data and reports indicative of evacuations and absence of persons in the area can be inconclusive. In some embodiments, computer readable medium may include instructions for determining that a user/building (target destination) within the geographic region has been impacted by flooding based the information received. In addition, in some embodiments, information from various pre-existing networks may be utilized to determine the status of geographic regions following a disaster. For example, networks such as traffic lights, utilities info, road closures, service providers (cable, internet, etc.), and other sources can be considered. Also, information from Internet of Things sensors can be reviewed. This information can be used to determine disaster response strategies. Information from vehicle diagnostics and reporting systems can also be used.

Service 530 also includes a controller that may comprise various computing and communications hardware, such as servers, integrated circuits, displays, etc. Further, controller may include a device processor and a non-transitory computer readable medium including instructions executable by device processor to perform the processes discussed herein. The components of controller may be implemented in association with a mobile conditions monitoring center, such as vehicle (see FIG. 6), or in association with a control center or conditions monitoring center located in a permanent building (i.e., brick and mortar establishment).

As a specific non-limiting example, service 530 may receive Internet of Things information by a house 506 that has been impacted by flood water, as represented by moisture damage 510 at a first time T1 while moisture levels are high. In some embodiments, the house may be equipped with one or more moisture sensors configured to detect flooding. The service 530 may be configured to receive data from such sensors. Accordingly, in some embodiments, the information indicative of the status of moisture levels for which computer readable medium includes instructions to receive includes information regarding operating status of Internet of Things devices in the geographic region.

In some embodiments, the information indicative of the status of moisture for which the computer readable medium includes instructions to receive includes information regarding emergency telephone calls (e.g., 911 calls). Emergency call records may include reports of floodwater in the caller's home or in buildings nearby. Service 530, or a third party system, may analyze the information received regarding possible flooding, and may make determinations regarding the conditions in the geographic region from which the information is received. Service 530 may be configured to send information regarding the status of water levels to inform organizations and residents of the situation. For, example, in some embodiments, computer readable medium may include instructions for sending information regarding the status of flooding conditions to a plurality of users of system 500. Another way in which the determined conditions may be communicated to others is via the preparation and distribution of a map showing the localities in which water levels have been measured as over a threshold.

Once the service 530 determines a location has experienced a flood event, a triggering event can be understood to have occurred. In response, the service 530 will identify one or more target locations in a first stage 540. This information, along with a control signal, is then automatically generated and transmitted to a drone repository 550 nearest to the identified location.

Any suitable communication platform and/or protocol may be utilized for communication between the controller and the drones. The drones may be manually controlled or autonomously controlled. In some embodiments, a global positioning system (GPS) navigation system may be utilized to facilitate the delivery of the solar array to remote users, such as house 506. For example, in some embodiments, the controller may include a user interface from which a user may manually input a location to which the solar array should be delivered. Alternatively, controller may obtain location information recorded and transmitted by the service's sources. The controller may be configured to command the drones to deliver solar arrays to the designated location(s). Accordingly, computer readable medium may include instructions for receiving this location information and completing the drone delivery to the target location(s).

One or more dehumidification drone assemblies ("drones") 558, similar to assembly 300 of FIGS. 3 and 4 described above, are stationed at the drone repository 550 in preparation for performing a deployment operation in response to a triggering event. For purposes of this application, a triggering event refers to an event or sequence of events that matches a pre-selected condition and will cause a signal to be transmitted from service 530 to one or more drone systems for purposes of providing emergency moisture abatement assistance.

In different embodiments, the number of drones that will respond to the signal will vary based on the number of buildings and/or flooding levels reported or estimated by service 530. In another example, there may only be a limited number of drones in the repository 550, and so only the drone(s) available can respond. Based on the target location, navigation instructions can be generated, either by service 530 or a ground drone management communication system 552 (see ground system discussed above). Drone(s) 558 can then depart its initial location and begin to navigate to the designated target location in a second stage 560 based on the instructions and guidance received. Upon arriving at the target location (here, house 506), the drone(s) 558 will, using components of its onboard computing system, determine an entry point to the interior of the building. This may involve actual force being applied to a door to break open and allow ingress. In a third stage 580, the drone(s) 558 performs an automated dehumidification session, thereby reducing the impact of the flood on the structural integrity of the building, leading to lower moisture levels 590 at a second time T2.

Figure 6:
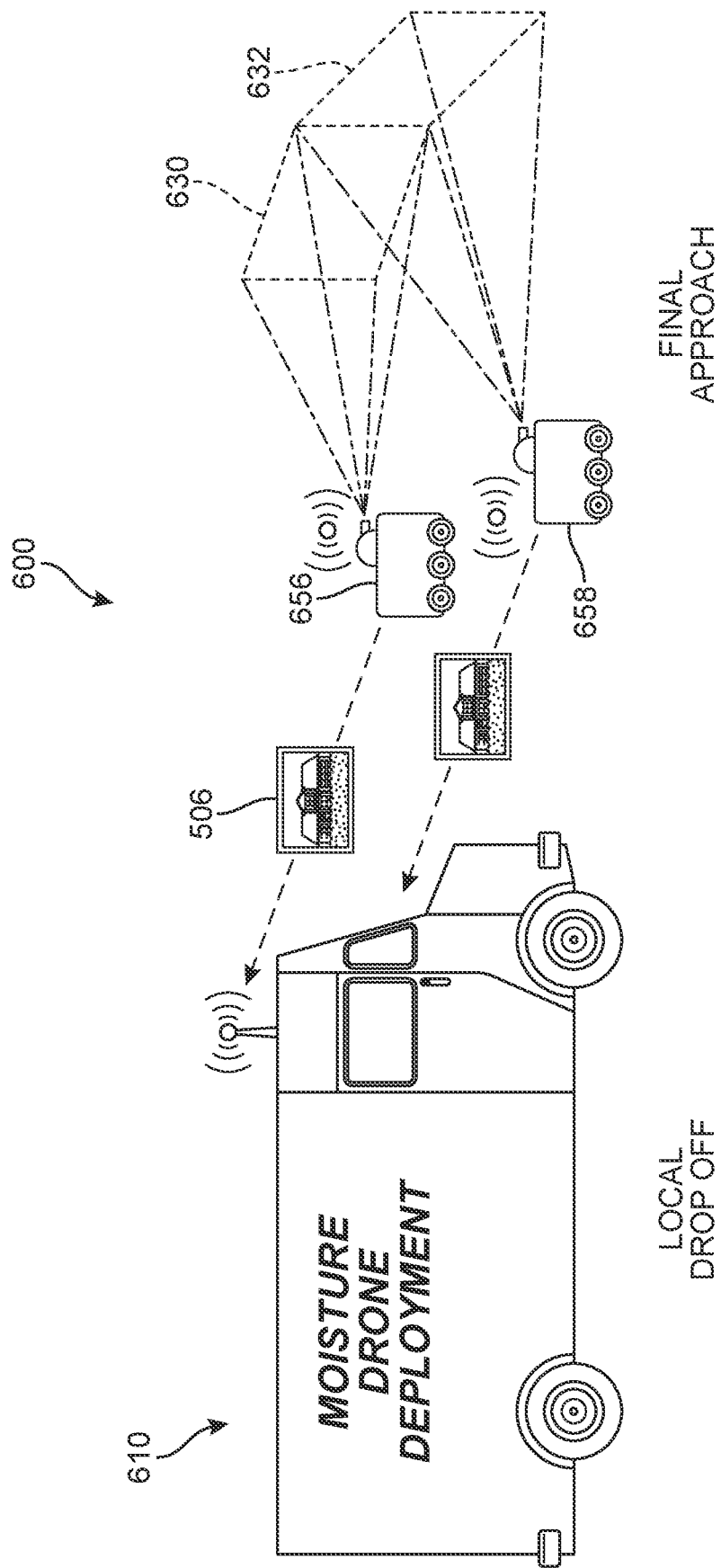
FIG. 6 is a depiction of a set of dehumidification drones approaching a target destination after initial transport via a drop-off vehicle, according to an embodiment.

In different embodiments, the proposed embodiments make use of land vehicle drones and/or watercraft drones. FIG. 6 is a schematic illustration of a post-disaster monitoring center 600 including a plurality of land vehicles (dehumidification assemblies) that have been mobilized. As shown in FIG. 6, center 600 may include a control center, such as a vehicle 610. Control center vehicle 610 may be configured to provide an initial transport of drones to an area near the affected buildings. In this case, a first dehumidification drone 656 and a second dehumidification drone 658 are deployed from vehicle 610. In some embodiments, these drones may be operated remotely. In some embodiments, these drones may be operated autonomously. Each drone will be provided with information about the target destination (e.g., house 506). As the drones are deployed, they move toward the house 506 and may in some cases work in concert (e.g., over a wireless network connection, radio, or other local wireless connection such as WAN, LAN, and MAN, etc.) to determine an optimal path and moisture treatment plan to be executed as a collective. As shown in FIG. 6, first dehumidification drone 656 performs an ongoing scan 630 and second dehumidification drone 658 performs an ongoing scan 632, each relying on sensors to approach and enter the house 506, shown in FIG. 7. In some embodiments, each drone can share sensor data (and/or information generated by its onboard computing device based on collected sensor data) with accompanying drones in order to generate a more cohesive, efficient approach to the dehumidification session.

Figure 7:
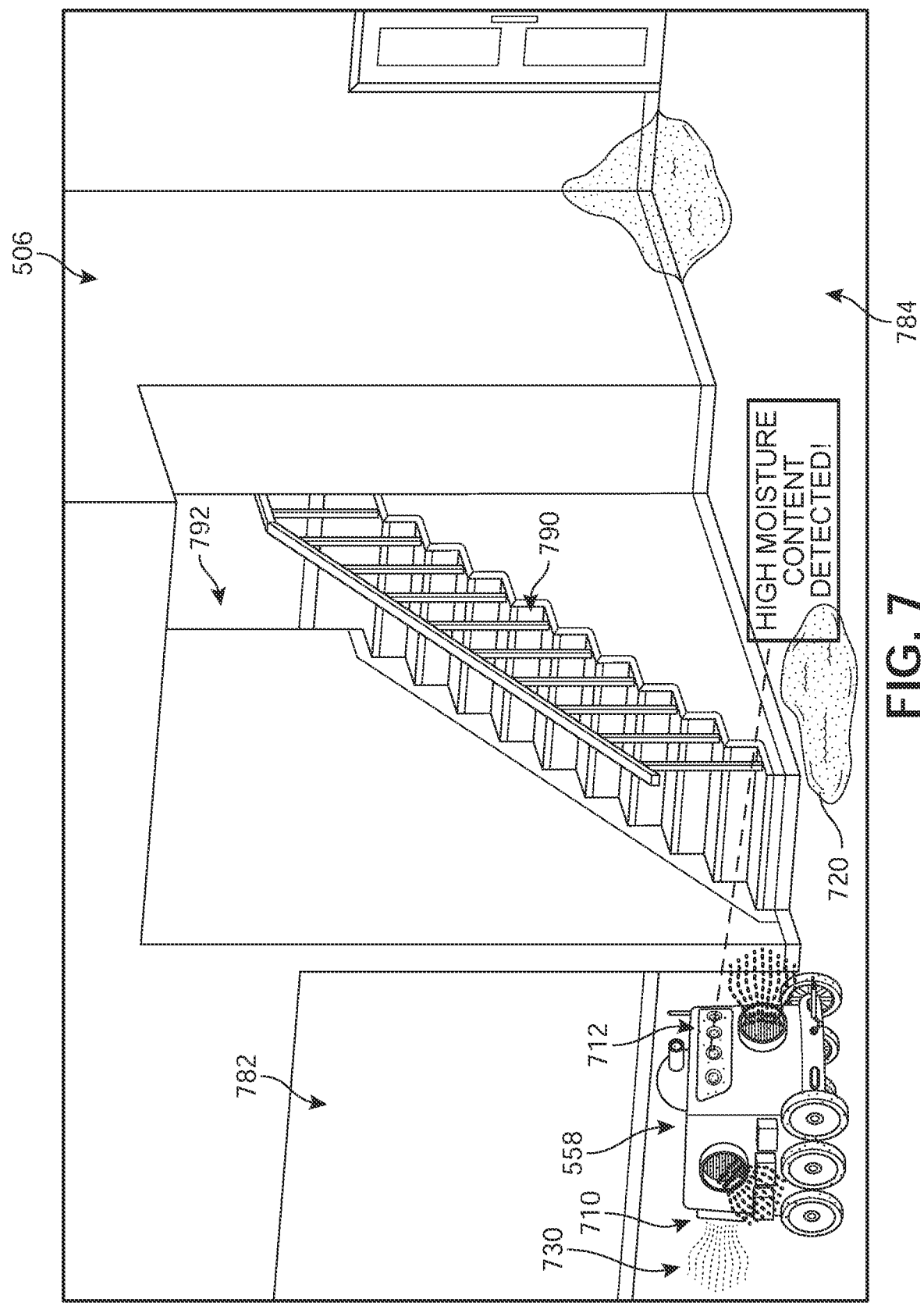
FIGS. 7 and 8 present an example in which the dehumidification drone navigates from one room in the residence to another room in the residence, detects areas of high moisture, and performs dehumidification of those areas, according to an embodiment.

FIG. 7 illustrates an example of first dehumidification drone 656 having entered house 506 and initiating its assessment of the structure based on sensor data 712 received via onboard camera(s), as well as other navigation sensors, and components associated with moisture detection. In some embodiments, the onboard computing system is configured to conduct an observational drive through the house 506 that allows the system to identify a plurality of potential moisture damage sites in order to coordinate dehumidification events, for example with other deployed drones, or in order to prioritize the treatment to those areas that are most likely to benefit from the dehumidification.

In FIG. 7, first dehumidification drone 656 has activated a dehumidifier mode 710, and as it moves from a first room 782 into a second room 784, dry air 730 is produced as it detects and pulls in moisture. The first dehumidification drone 656 pauses at a puddle 720 near stairwell 790 to more directly target the moisture on the floor. In some embodiments, the drone can include provisions to drive or otherwise navigate up and down stairs in order to access and treat different floors 792. For example, a land drone can include a track system rather than (or in addition to) wheels, or include a stair-climbing gait mechanism for a wheeled vehicle. In some embodiments, an aerial drone on which a dehumidifier device is mounted, installed, or integrated may be used which can fly to different levels of a structure during its dehumidification efforts.

Figure 8:
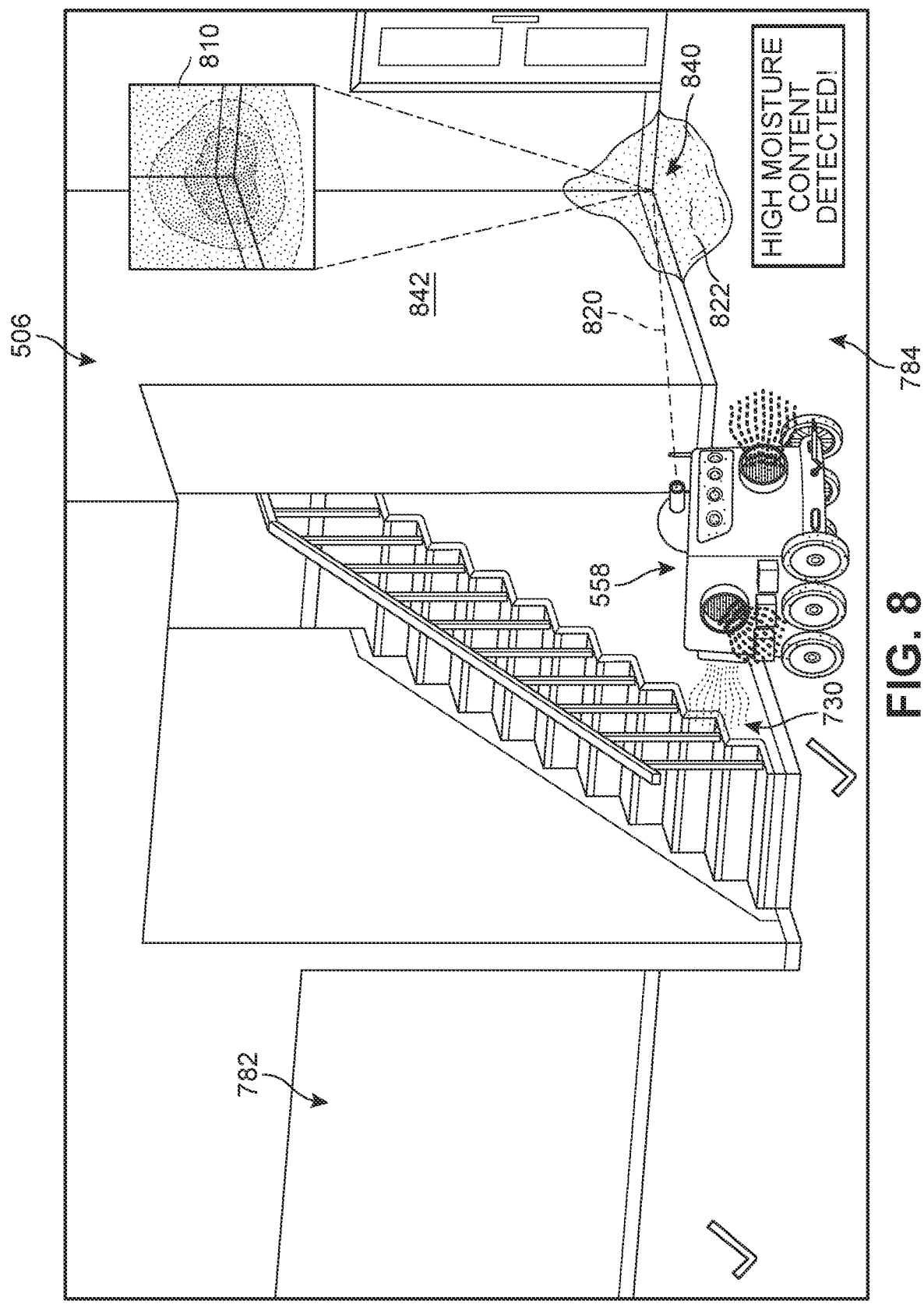

The first dehumidification drone 656 continues its travel into second room 784 in FIG. 8. Additional sensor data 820 collected via a laser array or other moisture detection sensor (see FIGS. 2A-2C) is used by the onboard computing system to determine a large source of moisture 822 is present in a corner portion 840 of wall region 842. In some embodiments, sensors can detect interior moisture damage 810 that can trigger additional actions, such as a tap or drill (see FIG. 3). In different embodiments, the drone has a battery that will have been charged prior to departure from repository or deployment vehicle. This battery can power the operation of the drone during its travel and dehumidification activity. Once a region of moisture is detected (i.e., a moisture content level above a pre-set threshold), as shown in FIG. 8m the drone can direct its efforts to the target area.

Figure 9:
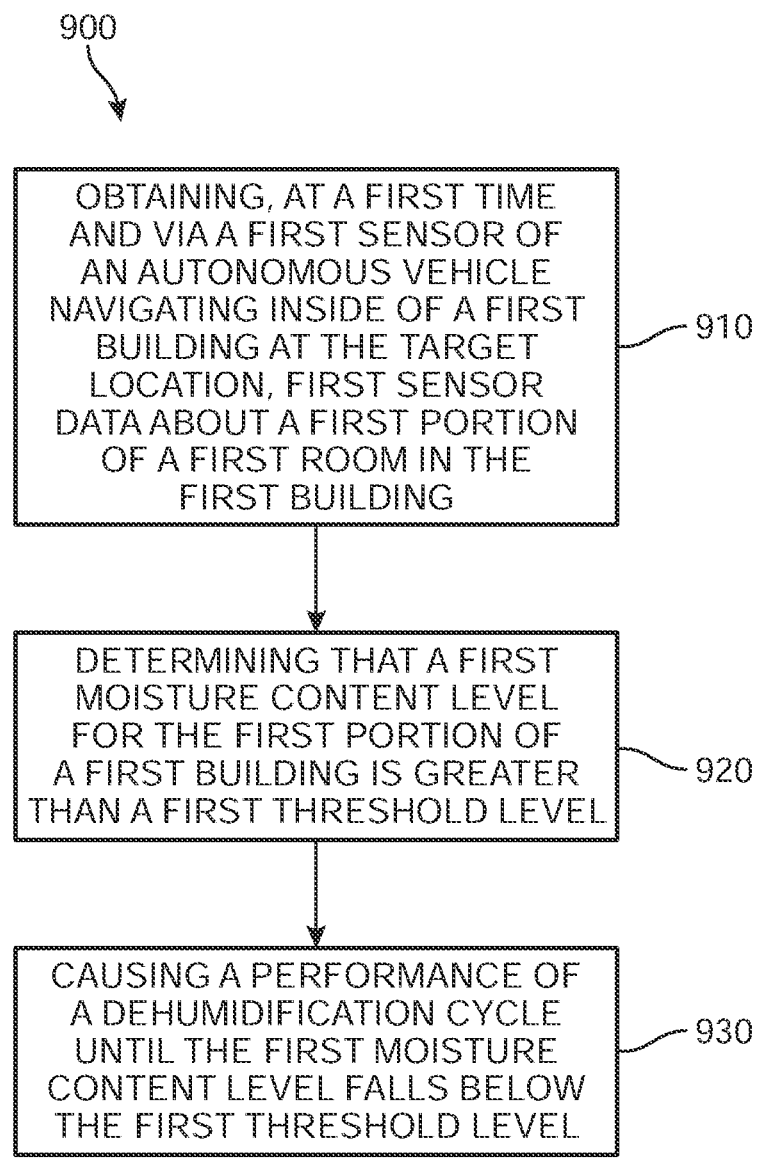
FIG. 9 is a flow chart depicting a process of providing moisture-reduction services at a target location, according to an embodiment.

FIG. 9 is a flow chart illustrating an embodiment of a method 900 of providing moisture-reduction services at a target location. The method 900 includes a first step 910 of obtaining, at a first time and via a first sensor of an autonomous vehicle navigating inside of a first building at the target location, first sensor data about a first portion of a first room in the first building. A second step 920 includes determining, at an onboard computing system for the autonomous vehicle and based on the first sensor data, that a first moisture content level for the first portion of a first building is greater than a first threshold level, and a third step 930 includes causing, via the onboard computing system, a dehumidification device installed on the autonomous vehicle to perform a first dehumidification cycle directed at the first portion at least until the first moisture content level falls below the first threshold level. The autonomous vehicle may also be referred to herein as a drone. The drone is configured to travel over land (on and off-road), as well as over or through water and in some cases may also be configured for air travel.

In other embodiments, the method may include additional steps or aspects. In some examples, the method includes steps of orienting a second sensor of the autonomous vehicle toward a second portion of the first room, obtaining, via the second sensor, second sensor data about the second portion, determining, at the onboard computing system and based on the second sensor data, that a second moisture content level of the second portion falls below the first threshold level, and causing, via the onboard computing system, the autonomous vehicle to navigate away from the first room and toward a second room of the first building. In another example, the method includes steps of obtaining, via the first sensor, second sensor data about a second portion of the first room, determining, at the onboard computing system, that a second moisture content level of the second portion is above the first threshold level, and causing, via the onboard computing system, the autonomous vehicle to navigate from the first portion to the second portion and initiate a second dehumidification cycle directed at the second portion.

In another example, the method also includes steps of determining, at the onboard computing system, that the first moisture content level is above a second threshold level, and causing, via the onboard computing system, a robot effector arm to tap a hole into the first portion in order to increase airflow. In one embodiment, the method includes causing, via the onboard computing system, the release of a dehumidification bag in the first room before departing the first room. The bag can be dropped from a hook extending from the housing of the drone. In some embodiments, the method can further include steps of transmitting, prior to the first time, a signal identifying the target location from a remote computing system for a dehumidifier abatement service to the autonomous vehicle, the autonomous vehicle being stationed in a drone repository, and causing, via the onboard computing system and in response to the signal, the autonomous vehicle to execute a path from the drone repository to the target location. In another example, the method also includes determining a power level (i.e., of an onboard battery) for the autonomous vehicle has fallen below a minimum level, and causing, via the onboard computing system, the autonomous vehicle to execute a return path from the target location to the drone repository. In some examples, the method also includes steps of determining all areas accessible to the autonomous vehicle in the first building no longer are associated with moisture content levels above the first threshold level, and causing, via the onboard computing system, the autonomous vehicle to execute a return path from the target location to the drone repository.

As described herein, some of the proposed embodiments can be understood to include a drone-based dehumidification system. The drone-based dehumidification system can include an unmanned autonomous vehicle, a dehumidification device installed on the autonomous vehicle, a plurality of moisture detection sensors, and an onboard computing system configured to receive and process data from the sensors. In some embodiments, the system also includes a remote server configured to transmit a signal to the autonomous vehicle indicating a target destination to which it should travel. In another example, the system also includes a plurality of dehumidification bags stored along an exterior surface of a housing of the autonomous vehicle.

It is appreciated that methods in accordance with the present disclosure can include any combination of the aspects and features described herein. That is, methods and systems in accordance with the present disclosure are not limited to the combinations of aspects and features specifically described herein, but also include any combination of the aspects and features provided.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

The computing devices and systems described herein may include one or more processors, a memory, one or more storage devices, and one or more input/output (I/O) devices controllable via one or more I/O interfaces. The various components may be interconnected via at least one system bus, which may enable the transfer of data between the various modules and components of the system.

The processor(s) may be configured to process instructions for execution within the system. The processor(s) may include single-threaded processor(s), multi-threaded processor(s), or both. The processor(s) may be configured to process instructions stored in the memory or on the storage device(s). The processor(s) may include hardware-based processor(s) each including one or more cores. The processor(s) may include general purpose processor(s), special purpose processor(s), or both. The memory may store information within the system. In some implementations, the memory includes one or more computer-readable media. The memory may include any number of volatile memory units, any number of non-volatile memory units, or both volatile and non-volatile memory units. The memory may include read-only memory, random access memory, or both. In some examples, the memory may be employed as active or physical memory by one or more executing software modules.

The storage device(s) may be configured to provide (e.g., persistent) mass storage for the system. In some implementations, the storage device(s) may include one or more computer-readable media. For example, the storage device(s) may include a floppy disk device, a hard disk device, an optical disk device, or a tape device. The storage device(s) may include read-only memory, random access memory, or both. The storage device(s) may include one or more of an internal hard drive, an external hard drive, or a removable drive.

One or both of the memory or the storage device(s) may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system. In some implementations, the CRSM may include a data store that provides storage of computer-readable instructions or other information in a non-transitory format. The CRSM may be incorporated into the system or may be external with respect to the system. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) and the memory may be supplemented by, or incorporated into, one or more application-specific integrated circuits (ASICs).

The system may include one or more I/O devices. The I/O device(s) may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) may also include one or more output devices such as a display, LED(s), an audio output device (e.g., a speaker), a printer, a haptic output device, and so forth. The I/O device(s) may be physically incorporated in one or more computing devices of the system, or may be external with respect to one or more computing devices of the system.

The system may include one or more I/O interfaces to enable components or modules of the system to control, interface with, or otherwise communicate with the I/O device(s). The I/O interface(s) may enable information to be transferred in or out of the system, or between components of the system, through serial communication, parallel communication, or other types of communication. For example, the I/O interface(s) may comply with a version of the RS-232 standard for serial ports, or with a version of the IEEE 1284 standard for parallel ports. As another example, the I/O interface(s) may be configured to provide a connection over Universal Serial Bus (USB) or Ethernet. In some examples, the I/O interface(s) may be configured to provide a serial connection that is compliant with a version of the IEEE 1394 standard. The I/O interface(s) may also include one or more network interfaces that enable communications between computing devices in the system, or between the system and other network-connected computing systems. The network interface(s) may include one or more network interface controllers (NICs) or other types of transceiver devices configured to send and receive communications over one or more networks, such as the network(s), using any network protocol.

Computing devices of the system may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents.

The invention claimed is:

1. A method of providing moisture-reduction services at a target location, the method comprising:
    obtaining, at a first time and via a first sensor of an autonomous vehicle navigating inside of a first building at the target location, first sensor data about a first portion of a first room in the first building;
    determining, at an onboard computing system for the autonomous vehicle comprising a processor and a memory and based on the first sensor data, that a first moisture content level for the first portion of the first building is greater than a first threshold level;
    causing, via the onboard computing system, a dehumidifier installed on the autonomous vehicle to perform a first dehumidification cycle directed at the first portion at least until the first moisture content level falls below the first threshold level;
    determining, at the onboard computing system, that the first moisture content level is above a second threshold level; and
    causing, via the onboard computing system, a robot effector arm to tap a hole into the first portion in order to increase airflow.

2. The method of claim 1, further comprising:
    orienting a second sensor of the autonomous vehicle toward a second portion of the first room;
    obtaining, via the second sensor, second sensor data about the second portion;
    determining, at the onboard computing system and based on the second sensor data, that a second moisture content level of the second portion falls below the first threshold level; and
    causing, via the onboard computing system, the autonomous vehicle to navigate away from the first room and toward a second room of the first building.

3. The method of claim 2, further comprising causing, via the onboard computing system, release of a dehumidification bag in the first room before departing the first room.

4. The method of claim 1, further comprising:
obtaining, via the first sensor, second sensor data about a second portion of the first room;
determining, at the onboard computing system, that a second moisture content level of the second portion is above the first threshold level; and
causing, via the onboard computing system, the autonomous vehicle to navigate from the first portion to the second portion and initiate a second dehumidification cycle directed at the second portion.

5. The method of claim 1, further comprising:
transmitting, prior to the first time, a signal identifying the target location from a remote server for a dehumidifier abatement service to the autonomous vehicle, the autonomous vehicle being stationed in a drone repository; and
causing, via the onboard computing system and in response to the signal, the autonomous vehicle to execute a path from the drone repository to the target location.

6. The method of claim 1, further comprising:
determining a power level for the autonomous vehicle has fallen below a minimum level; and
causing, via the onboard computing system, the autonomous vehicle to execute a return path from the target location to a drone repository.

7. The method of claim 1, further comprising:
determining all areas accessible to the autonomous vehicle in the first building no longer are associated with moisture content levels above the first threshold level;
causing, via the onboard computing system, the autonomous vehicle to execute a return path from the target location to a drone repository.

8. A drone-based dehumidification system, comprising:
an unmanned autonomous vehicle;
a dehumidification device installed on the autonomous vehicle;
a plurality of moisture detection sensors;
an onboard computing system; and
a robot arm with an end effector extending from a housing of the autonomous vehicle, the end effector comprising a spindle configured to tap and drill holes in walls.

9. The system of claim 8, further comprising a remote server configured to transmit a signal to the autonomous vehicle indicating a target destination to which it should travel.

10. The system of claim 8, further comprising a plurality of dehumidification bags stored along an exterior surface of a housing of the autonomous vehicle.

11. A system for providing moisture-reduction services at a target location, the system comprising one or more computers and one or more storage devices storing instructions that are operable, when executed by the one or more computers, to cause the one or more computers to:
obtain, at a first time and via a first sensor of an autonomous vehicle navigating inside of a first building at the target location, first sensor data about a first portion of a first room in the first building;
determine, at an onboard computing system for the autonomous vehicle and based on the first sensor data, that a first moisture content level for the first portion of the first building is greater than a first threshold level;
cause, via the onboard computing system, a dehumidification device installed on the autonomous vehicle to perform a first dehumidification cycle directed at the first portion at least until the first moisture content level falls below the first threshold level;
determine, at the onboard computing system, that the first moisture content level is above a second threshold level; and
cause, via the onboard computing system, a robot effector arm to tap a hole into the first portion in order to increase airflow.

12. The system of claim 11, wherein the instructions further cause the processor to:
orient a second sensor of the autonomous vehicle toward a second portion of the first room;
obtain, via the second sensor, second sensor data about the second portion;
determine, at the onboard computing system and based on the second sensor data, that a second moisture content level of the second portion falls below the first threshold level; and
cause, via the onboard computing system, the autonomous vehicle to navigate away from the first room and toward a second room of the first building.

13. The system of claim 12, wherein the instructions further cause the processor to cause the autonomous vehicle to release a dehumidification bag in the first room before departing the first room.

14. The system of claim 11, wherein the instructions further cause the processor to:
obtain, via the first sensor, second sensor data about a second portion of the first room;
determine, at the onboard computing system, that a second moisture content level of the second portion is above the first threshold level; and
cause, via the onboard computing system, the autonomous vehicle to navigate from the first portion to the second portion and initiate a second dehumidification cycle directed at the second portion.

15. The system of claim 11, wherein the instructions further cause the processor to:
transmit, prior to the first time, a signal identifying the target location from a remote server for a dehumidifier abatement service to the autonomous vehicle, the autonomous vehicle being stationed in a drone repository; and
cause, via the onboard computing system and in response to the signal, the autonomous vehicle to execute a path from the drone repository to the target location.

16. The system of claim 11, wherein the instructions further cause the processor to:
determine a power level for the autonomous vehicle has fallen below a minimum level; and
cause, via the onboard computing system, the autonomous vehicle to execute a return path from the target location to a drone repository.

17. The system of claim 11, wherein the instructions further cause the processor to:
determine all areas accessible to the autonomous vehicle in the first building no longer are associated with moisture content levels above the first threshold level;
cause, via the onboard computing system, the autonomous vehicle to execute a return path from the target location to a drone repository.

* * * * *